_United States Patent Office_

2,718,523
Patented Sept. 20, 1955

2,718,523

PREPARATION OF PHYTIC ACID AND SOLUBLE SALTS THEREOF BY CATION EXCHANGE

McCalip J. Thomas, Decatur, Ill., assignor to A. E. Staley Manufacturing Company, Decatur, Ill., a corporation of Delaware No Drawing. Application January 25, 1951,
Serial No. 207,847

6 Claims. (Cl. 260—461.3)

This invention relates to the preparation of phytic acid and water-soluble phytate salts from water-insoluble phytate salts.

Phytic acid is a phosphoric acid ester of inositol, in which each of the six hydroxyl groups is inositol has been esterified with a molecule of orthophosphoric acid. Since orthophosphoric acid is a tribasic acid and since only one hydrogen is affected in the esterification with the hydroxyl group of the inositol, each molecule of phosphoric acid is still functional as a dibasic acid. Since there are six of these phosphoric acid molecules now associated with inositol in the ester, the ester functions as a dodecabasic acid. As such, the phytic acid is capable of forming salts in which metallic and other positive ions may replace hydrogen in the acid in varying degrees, up to the limit of replacing all twelve hydrogen atoms.

The most widely occurring salt of phytic acid is Phytin, found in many plants, especially in the seeds. One of the best sources of Phytin is corn steepwater, the liquor obtained in the corn wet-milling process. Phytin is a generic term covering the salts containing calcium and magnesium, but sodium, potassium and other metals are ordinarily present in the naturally-occurring salts.

Phytin is classed as a water-insoluble substance, only a very small fraction of one part being soluble in a hundred parts of water. Calcium phytate, for example, dissolves in water only to the extent of about one milligram (0.001 g.) per 100 g. of water at room temperature; the solubility does not change appreciably with increasing temperature. Substances of this type are variously referred to as insoluble, sparingly soluble, difficultly soluble, or very slightly soluble.

Phytin is the raw material which has commonly been used in various processes for the preparation of phytic acid and water-soluble phytate salts. There are only a very few processes of this type, and they are quite laborious, cumbersome and costly.

One of the prior art processes is to dissolve Phytin in hydrochloric acid, and by the addition of a soluble copper salt precipitate an insoluble copper phytate; this compound is then slurried in water and the slurry saturated with hydrogen sulphide, whereupon the copper is precipitated as very insoluble copper sulphide and phytic acid is formed and remains in solution. If water-soluble salts are desired, e. g. sodium phytate, this phytic acid is then neutralized with sodium hydroxide. The acid or salt obtained is not pure because the copper phytate precipitated in the process is not a pure copper phytate, having other metals in it which were originally present in the phytin.

Another process which has been used is to dissolve the phytin in hydrochloric acid, remove some of the calcium and the magnesium by the use of a precipitating agent such as oxalic acid, and then add large quantities of alcohol to precipitate an acid phytate salt. The product obtained is a water-soluble salt of phytic acid, in which some of the acid hydrogen atoms have been replaced with metal atoms.

It is a principal object of this invention to provide an improved method for the preparation of phytic acid. Another object is to provide an improved method for the preparation of water-soluble salts of phytic acid.

By this invention, a new, unobvious and efficient method has been developed for the preparation of water-soluble phytates and phytic acid from Phytin or similar water-insoluble salts of phytic acid. This invention is based on the unexpected discovery that when such water-insoluble salts are slurried in water with acid-regenerated cation-exchange resins, they react to form water-soluble acid salts and/or phytic acid, through the replacement in the Phytin molecule of the metal ions with hydrogen ions from the resin, the resin at the same time adsorbing these metal ions from the phytin.

The utility of the invention described herein lies in the fact that water-insoluble phytate salts can be converted to water-soluble phytate salts of varying metal ion content and thus varying degrees of acidity. In fact, the process allows the complete removal of metal ions to form the free acid, which is known as phytic acid.

The various water-soluble phytates potentially available by the application of this invention are of importance because they open up an entirely new field for investigation. Such salts have not been readily prepared and were only obtained in most cases as experimental products in research investigations, and then only resulting from the application of tedius chemical methods. Heretofore, there has not been developed a systematic process for the production of water-soluble phytates or phytic acid from water-insoluble phytates.

The availablility of a series of such salts and of the free acid opens up a new avenue for investigations, such as the production of substances for water softening, the production of mixed metal ion salts, scavenger agents for removal of heavy metals, esters containing metal ions, salts of high acidity for use as an ingredient of baking powders, pharmaceutical use or as a fire-proofing agent for textiles. The free acid lends itself to the preparation of various esters which might have use in the industrial field as plasticizers or for pharmaceutical use.

The essence of the invention lies in the fact that acid regenerated cation adsorbing ion exchange resins are utilized to remove the metal ions either in part or completely from water-insoluble phytate salts, thus producing a water-soluble phytate which may be easily separated from the resin and the salt isolated therefrom. The idea of using an ion exchange resin in a water slurry of an insoluble phytate as a means for solubilizing a water-insoluble phytate is novel. Prior methods used in investigations on the structural aspects of phytin involved tedious and long, drawn-out chemical schemes, some of which led to the isolation of acidic salts of Phytin. As stated, however, these were merely experimental in nature, with no serious attempts to make products on a commercial scale. Such processes lead to contamination of the desired product with metals, the nature of which depend on the materials employed. The invention described in this memorandum cannot lead to contamination of the desired product since no chemicals are required in the main part of the process. The only point where any chemicals are required is in the resin regeneration step, where an acid is used to remove the metal ions from the resin. This step, however, is independent of the cation exchange stage which, obviously, is conducted separately.

The process of the invention herein described may be carried out by slurrying Phytin (calcium magnesium phytate) in sufficient water to make a thin slurry. The cation adsorbing resin operating on the hydrogen cycle may be added under agitation until the desired pH is obtained. This pH value does not correspond to the pH of a saturated solution of the soluble phytate. It is higher, Therefore, in order to prepare soluble phytates of any desired pH value or metal ion content, it is necessary to standardize on the concentration of phytate in the slurry prior to addition of resin. By simply preparing mixtures at varying pH values, isolating the soluble salt and determining the pH values of saturated solutions thereof and plotting these values against the pH value at which the resin addition was discontinued, a curve may be obtained which gives the pH value necessary in the mixture for obtaining soluble phytates of any pH value desired. In addition, a curve may be drawn correlating these values with the metal ion content of the phytate and in this manner one may choose to prepare a soluble phytate of any desired metal ion content and pH.

After obtaining the desired pH, by appropriate addition of resin, the aqueous medium is separated from the resin by decantation or filtration and heated to at least 150° F. for at leas about 10 minutes to insolubilize the small amount of metal phosphate or phytate which precipitates upon heating in acid medium. Actually, heating speeds up the insolubilization of this impurity which would otherwise precipitate slowly and incompletely on long standing at room temperature. If this material is not removed at this stage, it will precipitate later on in the process and remain as a contaminant of the final product. The solution is then treated with decolorizing carbon, yielding a colorless solution which is subsequently concentrated, preferably in vacuo, to a syrupy consistency, of about 46° Baumé at 100° F. This almost syrupy liquid is added portion-wise to three times its volume of anhydrous methanol under vigorous agitation whence, if the acid salt is being prepared, a dense white crystalline material separates. This product is filtered off and washed with a small volume of methanol and dried in an oven.

In preparing phytic acid sufficient resin is employed, either in one large batch or several smaller ones, until the solution gives a negative test for calcium, magnesium and other metals. After separation from the resin, the solution is carried through the process somewhat as in the case of the salts. However, it is not necessary to effect removal of the insolublizable substances, because they have been removed by the resin. Also, after decolorization with carbon and concentration in vacuo, it is not necessary to add methanol, because since all of the metal ions are removed no precipitate appears, phytic acid being completely soluble in alcohol. The product is phytic acid.

Another procedure which may be followed in preparing the various soluble phytate salts and phytic acid is to add only sufficient resin to the water slurry of the insoluble phytate until complete solution of the phytate occurs. This generally takes place at about 2 to 3 pH. The solution can then be separated from the resin and passed through a column of the resin, yielding a solution of phytic acid. Such a technique makes possible a large-scale handling of the process. In this manner, a more effective utilization of the resin results and a strongly acidic solution is obtained which may then be neutralized to give soluble phytate salts, if desired. This salt solution is then subjected to the heat treatment to remove insolubilizable materials, decolorized with carbon, concentrated and precipitated by addition of methanol. However, if phytic acid is desired, then all that is necessary is decolorization of the filtrate from the resin column treatment, after tests indicate that the solution is free of metal ions. This solution is then concentrated in vacuo to a syrupy consistency.

It is not necessary to conduct two separate steps in the case of heat insolubilizing and decolorizing treatments, for these may be carried out in one step. The decolorizing phase may be carried out simultaneously with the heat insolubilizing phase and both the insoluble matter and carbon filtered off as a mixture. The filtrate may then be concentrated and worked up in the usual manner for soluble phytates or phytic acid.

An effective agent for precipitation of the soluble salts is methanol. Ethanol can be used, as well as any organic solvent which is soluble in water and in which the salt is insoluble. Examples are acetone, methyl ethyl ketone, diethyl ketone, etc. Methanol and ethanol are preferred to the other precipitants, methanol being the first choice.

Any hydrogen exchange resin may be used in this process. One resin used in this work was Duolite C-3 cation exchanger. The exchanger was always used in the hydrogen form. Other resins in the hydrogen form which may be used are Amberlite IR-100, Nalcite HCR, and Dow-X-50. There are others which may be added to this list. Duolite C-3 and Amberlite IR-100 are sulfonated polyphenols and Nalcite HCR and Dow-X-50 are sulfonated polystyrenes. It must be taken into account in using these resins that the capacities for adsorbing the metal ions may vary widely and as a result the same volume of the different resins will not produce the same degree of reaction.

The invention will be illustrated in the following examples:

EXAMPLE 1

*Preparation of soluble acid phytate salt*

Calcium phytate containing 14.1% moisture, 22.6% calcium, 20.4% total phosphorous, 18.5% organic phosphorous, 0.07% total nitrogen and 0.49% solubles was used.

350 g. (300 g. dry substance basis (D. S. B.)) was slurried in 4 l. tap water, the slurry having a pH of 6.8. During vigorous agitation moist, acid regenerated cation adsorbing resin (Nalcite HCR) was added in portions and the mixture agitated until the pH was constant. The amount of resin necessary to give pH 2.0 was about 5200 ml. At this pH all of the original phytate was dissolved. The slurry was filtered and the resin washed with 2 l. of water in several portions. The washings and main filtrate were combined and heated at 160° for about 30 minutes to insolubilize contaminating substances. The insolubles were filtered off and dried in an oven. The weight of the dry powder was 10.0 g.

The filtrate was evaporated in vacuo to a volume of 1 liter and then treated by slurrying with 10 g. of decolorizing carbon. The mixture was filtered and the filtrate evaporated in vacuo to a syrupy consistency. Weight 381 g., Baumé 47.6 @ 64° F.

The syrupy solution was added slowly to 750 mls. of highly agitated anhydrous ethanol, whence the product easily separated in crystalline form. It was then washed with 50 ml. of fresh ethanol. After drying in the oven, the white product weighed 184.4 g. It was quite water-soluble and contained 11.1% calcium. 1.0 g. in 10 ml. distilled water gave a pH of 2.23.

EXAMPLE 2

*Preparation of soluble acid phytate salt*

Phytin (266.3 g. D. S. B.) analyzing 11.3% moisture, 16.2% calcium, 3.7% magnesium, 16.8% total phosphorous, 15.6% organic phosphorous and 0.8% total nitrogen was slurried in 3425 ml. tap water and under strong agitation 3500 ml. of moist, acid regenerated resin (Amberlite IR-100) was added portionwise. The pH reached at equilibrium was 3.0, and most of the Phytin was now dissolved.

The slurry was filtered and the resin washed with 1750 ml. of water, in portions. The washings and main filtrate were combined and filtered to remove a small amount of extraneous materials, such as particles of resin. The solution was heated at 180° for about 15 minutes and the insolubilized material was filtered off and dried. The weight of the dry powder was 11.1 g.

The filtrate was evaporated in vacuo to about one liter, then decolorized by slurrying with 10 g. of decolorizing carbon and filtered. The colorless filtrates was further evaporated in vacuo to a syrupy consistency. The weight of the product 385 g. Baumé 45.2 @ 105° F.

The syrupy solution was slowly added to 750 ml. of rapidly stirred, anhydrous methanol. After washing with 50 ml. fresh methanol, the white product was dried in the oven. Weight 200.8 g. It was quite water-soluble and contained 12.8% calcium and 2.1% magnesium. 1.0 g. in 10 ml. water had a pH of 2.99.

EXAMPLE 3

*Preparation of phytic acid*

Phytate (103.3 g. D. S. B.) analyzing 20.7% moisture, 4.7% calcium, 10.9% magnesium, 20.2% total phosphorous, 19.0% organic phosphorous, and 0.2% total nitrogen was slurried in one liter of water. The pH of the slurry was 6.6.

Under mechanical stirring moist, acid regenerated Duolite C-3 cation exchanger was added to an equilibrium pH of 2.5. This pH represented the value at which all of the phytin was completely in solution. The amount of resin required was 1250 ml. The solution was separated from the resin by filtration and the resin washed with 500 ml. water and the combined filtrate and washings were decolorized by treatment with 5 g. NuChar CN.

The slightly yellow solution was then passed through a 64 cm. x 4½ cm. column of moist, acid regenerated resin. The effluent had a pH of 0.86. The column was washed with 500 ml. water and the washings combined with the main effluent. This solution gave a negative test for metals. The solution was evaporated in vacuo to a viscous straw-colored syrup weighing 97.2 g., which was completely soluble in alcohol.

The invention described herein gives a systematic method for the production of water-soluble phytates and phytic acid from water-insoluble phytates. No such methods are described in the literature.

As shown in U. S. Pat. No. 1,290,971, an extensive and tedious process is used for the preparation of the di-basic calcium salt of phytic acid and phytic acid. These processes include the use of several chemicals, some of which, such as oxalic acid and barium salts, are poisonous and do not lend themselves to acceptance for use in food products. Other disadvantages would be the handling and washing of large amounts of precipitates. Repeated precipitation techniques multiply this disadvantage. Too, the use of hydrogen sulfide in the preparation of phytic acid is a tedious and undesirable commercial process, especially in commercial scale operations.

The process described herein for the production of water-soluble phytates and phytic acid involves only the use of a cation adsorbing resin, a water-soluble organic solvent, and an acid for resin regeneration. The resin may be used repeatedly by regeneration after each use. The organic solvent may be recovered and re-used in the process.

That which is claimed as new is:

1. The process of preparing a water-soluble phytate salt from a water-insoluble phytate salt comprising preparing and agitating a slurry of the water-insoluble phytate, water and a sufficient proportion of an acid-regenerated cation exchange resin until the water-insoluble phytate substantially converted to a water-soluble phytate, separating the resin and recovering the water-soluble phytate from the solution.

2. The process of preparing a water-soluble phytate salt from Phytin comprising preparing and agitating slurry of Phytin, water and a sufficient proportion of a acid-regenerated cation exchange resin until the Phytin is substantially converted to a water-soluble phytate, separating the resin and recovering the water-soluble phytate from the solution.

3. The process of preparing phytic acid from a water insoluble phytate salt comprising preparing and agitating a slurry of the water-insoluble phytate, water and a sufficient proportion of an acid-regenerated cation exchange to solubilize and convert the phytate to phytic acid, separating the resin and recovering the phytic acid from the solution.

4. The process of preparing phytic acid from a water insoluble phytate comprising preparing and agitating a slurry of the water-insoluble phytate, water and a sufficient proportion of an acid-regenerated cation exchange resin until the water-insoluble phytate is substantially converted to a water-soluble phytate, separating the resin from the resulting phytate solution, and passing said phytate solution through a column of acid-regenerated cation exchange resin until the solution is free of metal ions, and recovering the phytic acid from the solution.

5. The process of claim 1, wherein the recovery of the water-soluble phytate includes the step of heating the solution to precipitate impurities therefrom, prior to isolation of the phytates.

6. The process of treating a water-insoluble phytate salt comprising, forming an aqueous slurry of the insoluble phytate and a cation exchange resin, agitating said slurry so as to promote the conversion of insoluble phytate to soluble phytate, separating the resulting phytate solution from said resin and any insoluble phytate remaining, and passing said phytate solution through a column of cation exchange resin.

References Cited in the file of this patent

UNITED STATES PATENTS 2,497,062    Artz  _____ Feb. 14, 1950

OTHER REFERENCES

Rohm & Haas Co., Amberlite R–100, June 1, 1949, pages 1 and 5.

Iselin, J. Am. Chem. Soc. (Nov. 1949), vol. 71, pages 3822 to 3825.

Kunin and Myers, Ion Exchange Resins, page 128 (1950).